United States Patent
Ristow

[15] 3,690,713
[45] Sept. 12, 1972

[54] GRIPPING TOOL

[72] Inventor: Ulrich Ristow, Neu Isenburg, Germany

[73] Assignee: Licentia Patent-Verwaltungs G.m.b.H., Frankfurt am Main, Germany

[22] Filed: April 27, 1971

[21] Appl. No.: 137,756

[30] Foreign Application Priority Data

April 15, 1970 Germany..........P 20 17 912.8
April 15, 1970 Germany...HGM 70 13 719.8

[52] U.S. Cl. ................294/86 A, 176/30, 294/103 R
[51] Int. Cl..............................................B66c 1/62
[58] Field of Search .294/86 R, 86 A, 103 R; 176/12, 176/30, 31

[56] References Cited

FOREIGN PATENTS OR APPLICATIONS 1,098,175  4/1965  Germany.................294/86 A Primary Examiner—Evon C. Blunk
Assistant Examiner—Johnny D. Cherry
Attorney—Spencer & Kaye

[57] ABSTRACT

A gripper with a muzzle-shaped opening to receive loops on control rods and fuel elements of a nuclear reactor and guide these loops to a slit where they can be gripped by a rotatable gripping hook. An inset having an end wall and spaced walls projecting in the same direction from the end wall is designed to be slipped into engagement within the slit. In a first position the spaced walls project in the slit toward the muzzle-shaped opening to restrict the slit to the reception of a relatively narrow loop on a control rod. In a second position the spaced walls are reversed in the slit so that the full width of the slit toward the muzzle-shaped opening is available to receive the relatively wide loop on a fuel element.

7 Claims, 5 Drawing Figures

Patented Sept. 12, 1972

3,690,713

Inventor:
Ulrich Ristow

BY Spencer & Kaye
ATTORNEYS.

3,690,713

GRIPPING TOOL

BACKGROUND OF THE INVENTION

The invention relates to gripping tools used with fuel element exchange machines designed to service nuclear reactors.

During the exchange of fuel elements, which occurs, for example, once a year for light-water reactors, the spent fuel elements and, if required, damaged or spent control rods are exchanged for new ones. For this purpose gripping tools are employed which are fastened to a fuel element exchange machine and which engage in loops at the control rods or fuel elements, respectively.

Since the elements are substantially heavier than the control rods and the space available in the reactor core does not permit the use of heavier loops on the control rods than on the fuel elements, the loops of the control rods and those of the fuel elements must be of different design. Thus, the control rod loop is larger and has a smaller cross section than the fuel element loop.

Moreover, there exists a safety requirement that measures be taken which make it impossible for control rods to be removed, during the removal of fuel elements, in any way other than in accordance with the loading and unloading schedule. It must be taken into consideration that the operating personnel could be tempted, for labor saving reasons, to remove adjacent control rods and fuel elements in a consecutive order instead of working on differently positioned core positions. Such an unauthorized deviation from the prescribed loading and unloading schedule could produce a chain reaction in the nuclear fuel which would lead to a major reactor accident.

In order to prevent such operating errors, different grippers have heretofore been used to engage the loops of fuel elements and the loops of control rods. The gripper for the fuel elements is so designed that it is impossible to use it for the control rods.

A gripper for fuel elements in nuclear reactors is disclosed, for example, in German Pat. No. 1,098,175. The head piece of the gripper, as seen in FIG. 1 of that patent, consists of two plates in parallel arrangement, with each plate having, on opposite sides, a wedge-shaped recess. A gripper hook is pivotally disposed between the plates and is moved by a rod assembly. In this patent, in column 3, last sentence, it is stated, in translation, that "the recesses should be designed in dependence on the type and shape of the loads and the suspension possibilities." Thus this type of gripper has the drawback that it cannot be selectively used for different purposes.

SUMMARY OF THE INVENTION

It is an object of the invention to provide a gripper which can easily be adapted for gripping the different types of loops on control rods and fuel elements and which is so constructed that it is impossible, during the removal of fuel elements, to grip control rods.

This object is accomplished by providing a pivotal gripping hook which engages in a muzzle-shaped opening of a head piece and is associated with an insert disposed in the interior of the head piece in such a manner that it can be placed in at least two positions. The insert is so designed that it defines different slots for holding different shapes of loops.

DESCRIPTION OF THE PREFERRED EMBODIMENTS

Figure 1:
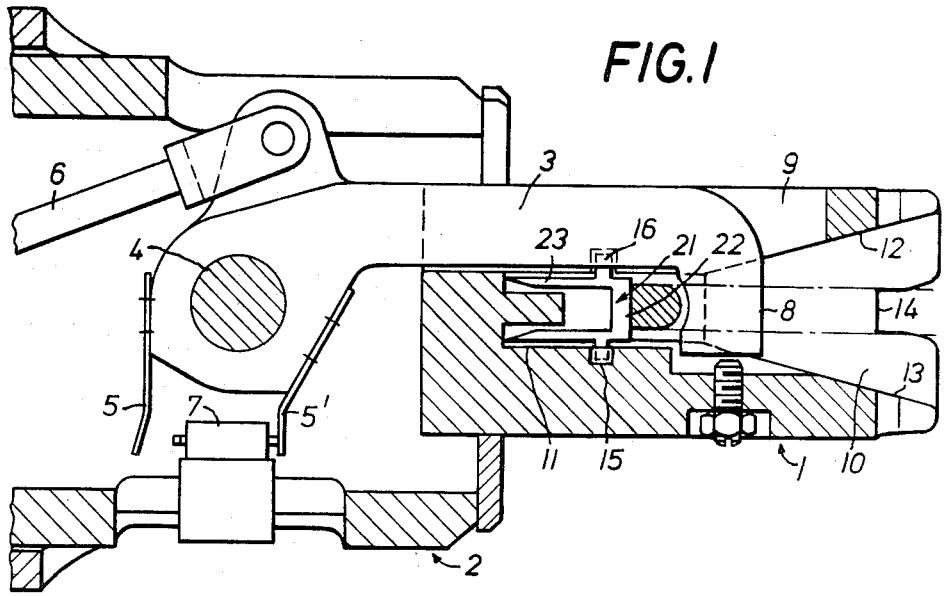
FIG. 1 is an elevational cross-sectional view through the lower portion of the gripper of one embodiment of the present invention.
Figure 2:
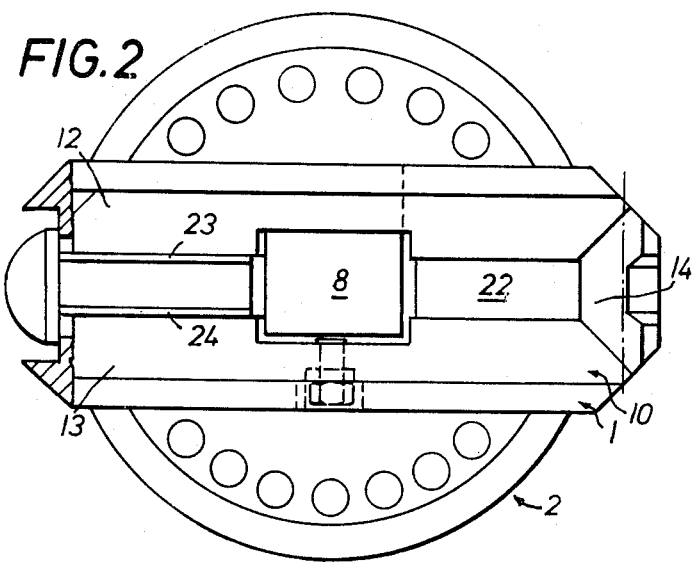
FIG. 2 is a bottom plan view, partially in section, of the gripper of FIG. 1.

Referring first to FIGS. 1 and 2, there is shown a head piece, generally indicated at 1, which is permanently connected with a cylindrical portion, generally indicated at 2. In use, head piece 1 extends downwardly from portion 2. A gripping hook 3 is rotatably mounted on a shaft 4 in the cylindrical portion 2. The endpositions "closed" and "opened" are signaled by the switch 7 actuated by the plates 5 and 5' on the gripping hook 3 that cooperate with the switch 7 on the cylindrical portion 2.

The front end 8 of the gripper hook 3 passes through a lateral cutout 9 in a muzzle-shaped opening, generally indicated at 10, of the head piece 1. This opening diverges downwardly. The gripper hook can be pivoted out of the muzzle-shaped opening 10 by means of a pulling rod 6. A transversely disposed slit 11 is formed in the interior of the head piece 1 and the converging walls 12, 13, 14 and another wall similar to 14 defining the muzzle-shaped opening 10, lead to this slit. When the gripper, according to the invention, is lowered toward a loop to be gripped, the muzzle-shaped opening 10 serves to center the gripper over the loop so that the loop can easily move into slit 11.

As can be seen in FIG. 1, aligned grooves 15 and 16 are disposed on both sides at slit 11 in wall portions of head piece 1. These grooves are designed to receive guide tongues 17 and 18, shown in FIG. 3, of an insert generally indicated at 21. The insert 21 is made of two pieces 21' and 21", so that it can be placed in slit 11 from both sides of the head piece 1. This insert is in the shape of a fork with an edn connecting wall 22 and spaced parallel walls 23 and 24.

Figure 3:
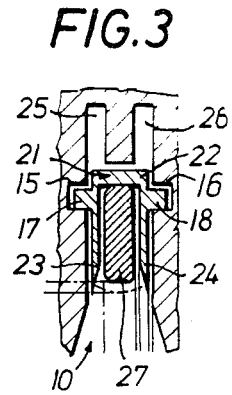
FIG. 3 is a detail view, to a larger scale, of an insert pushed into the gripper in a first position.
Figure 4:
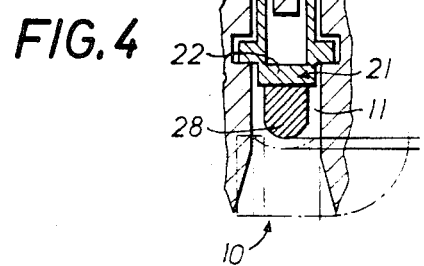
FIG. 4 is a detail view, to a large scale, of the insert pushed into the gripper in a second position.

As best seen in FIGS. 3 and 4, the slit 11 terminates in grooves 25 and 26 which can receive wall sections 23 and 24, as shown in FIG. 4.

Considering FIG. 3, a first position of the insert 21 is shown for holding a loop portion 27 of a control rod loop. In this insert position the walls 23 and 24 point toward the muzzle-shaped opening 10 and the width of slit 11 is reduced to accommodate the relatively long but narrow loop portion 27. It will be observed too that wall portion 22 provides an abutment wall for the loop portion 27 and is spaced from the muzzle-shaped opening 10.

In FIG. 4 the insert 21 is in a second position within slit 11 and in this position a relatively shorter and wider loop portion 28 of a loop of a fuel element is accommodated. Here walls 23 and 24 are received in the grooves 25 and 26 so that the full width of slit 11 is available but wall 22 is disposed to provide an abutment wall closer to the muzzle-shaped opening 10. With this two-position arrangement of the insert 21 in slit 11 it can be appreciated that because walls 23 and 24 lie in the slit 11 the wider loop portions 28 of loops on the fuel elements can not enter the slit 11 and therefore can not be gripped by gripper hook 3. On the other hand a loop portion 27 of a loop on a control rod can not go into slit 11 sufficient to be gripped by the gripper hook 3 because of abutment wall 22 of insert 21.

With respect to FIG. 2 it should be noted that in the left half portion of the figure the insert 21 is shown in the position for holding control rods, while in the right half portion of the figure the insert is shown to be in a position so that the full width of slit 11 is available for holding the fuel element loops.

Figure 5:
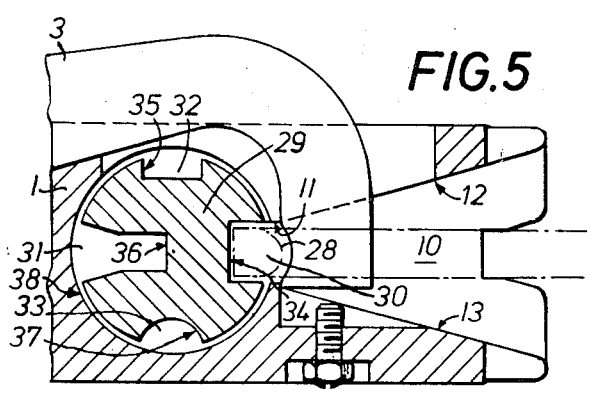
FIG. 5 is a detail view of the gripper, showing a further embodiment of the invention.

FIG. 5 shows a further embodiment of a gripper according to the present invention.

Instead of the described insert 21 in the interior of the muzzle - shaped opening 1 in slit 11 an insert 29 is provided in a transversal circularly widened portion 38, so that it can be rotated about a central axis. The insert 38 has different cutouts at different points on its periphery which are adapted to the different shapes of the loops. The embodiment shows an insert 29 with a cutout 34 for loops of the fuel elements and a cutout 31 for loops of the control rods.

References 32 and 33 indicate cutouts for other not specified loops of reactor core elements. By rotating the insert 29 the slit 11 of the muzzle - shaped opening 10 may be adopted for different loops. The walls 34, 35, 36 and 37 are provided as abutments walls for different loops and are adopted to the different shapes of the loops.

In this embodiment it is then easily possible to provide more or less than four different cutouts so that the gripping tool can be used for more or less than the above mentioned purposes.

It will be understood that the above description of the present invention is susceptible to various modifications, changes and adaptations, and the same are intended to be comprehended within the meaning and range of equivalents of the appended claims.

I claim:

1. In a gripper including a head piece having a muzzle-shaped opening to receive article transporting loops of different shapes and guide these loops to a slit portion at the interior of the muzzle-shaped opening where the loops can be releasably held by a movable gripping hook, the improvement comprising: an insert engageable in a plurality of positions within said slit, said insert being formed so that in each of its positions it enables only loops of one respective shape to be introduced into the slit portion to be held by the gripping hook.

2. An arrangement as defined in claim 1 wherein said insert includes guide means and said head piece includes associated guide means for receiving said insert guide means when said insert is engaged in the slit.

3. An arrangement as defined in claim 2 wherein said insert includes an end wall and spaced parallel walls extending in the same direction from said end wall.

4. An arrangement as defined in claim 3 wherein, for a first position of said insert, said parallel walls of said insert extend toward the muzzle-shaped opening to provide a restricted opening therebetween for the reception of a transporting loop having a width no greater than the space between said parallel walls.

5. An arrangement as defined in claim 4 wherein, in said first position, said end wall is an abutment wall for a transporting loop received in the space between said parallel walls.

6. An arrangement as defined in claim 3 wherein, for a second position of said insert, said parallel walls of said insert extend away from the muzzle-shaped opening and said end wall is an abutment wall for a transporting loop received in the slit.

7. An arrangement as defined in claim 1 wherein the slit portion has a circular cross section and said insert is shaped to rotate in said slit portion, said insert having cutout portions on the periphery thereof whereby different shaped transporting loops are selectively receivable in the loop receiving portion depending on the orientation of said insert in said slit portion.

* * * * *